May 14, 1968 R. A. LONG ET AL 3,383,684
SCAN RATE GENERATOR FOR A LAND MASS SIMULATOR
Filed Dec. 4, 1963
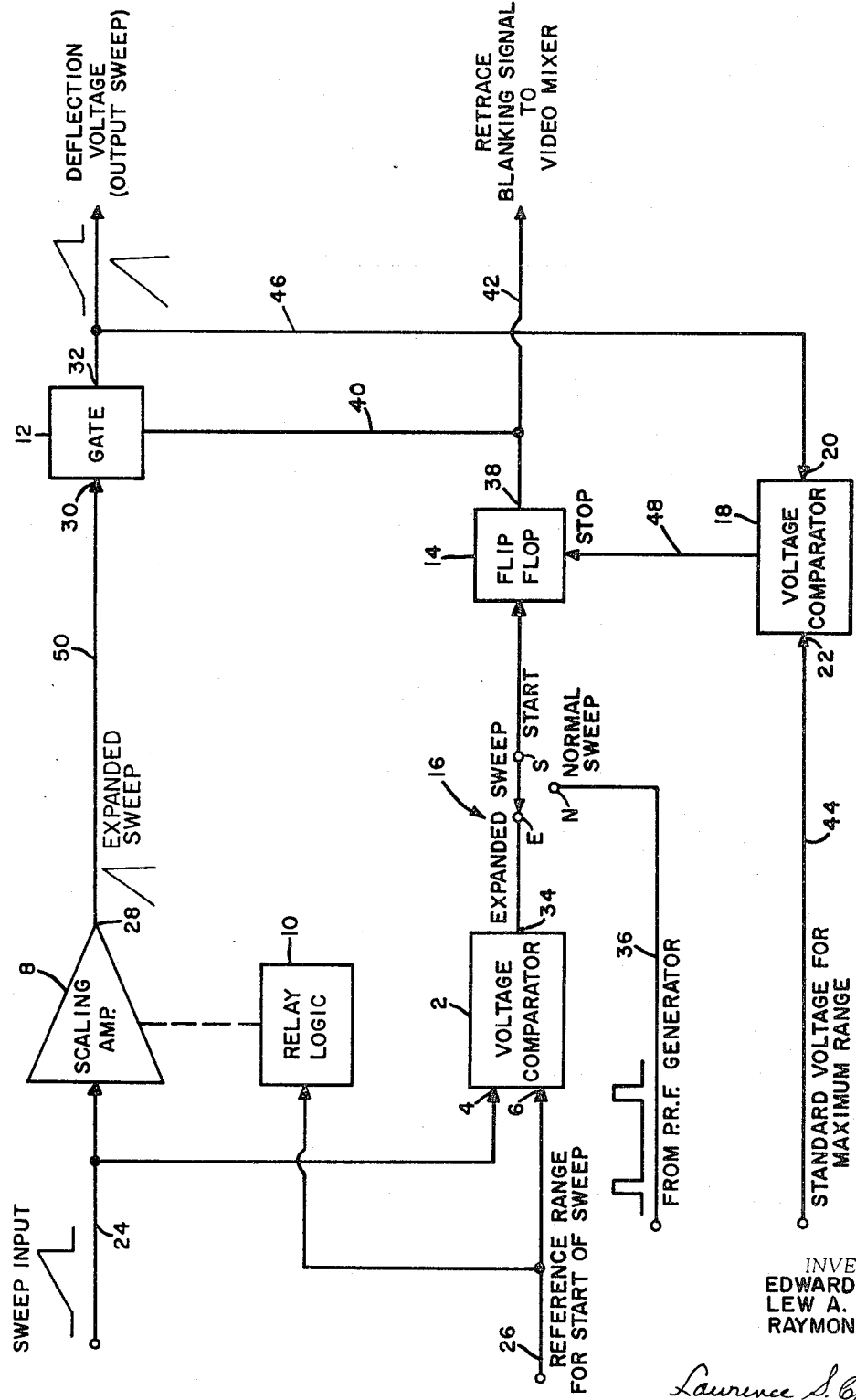
INVENTORS
EDWARD E. GRAY
LEW A. RANEY
RAYMOND A. LONG
Lawrence S. Epstein
ATTORNEYS

3,383,684
SCAN RATE GENERATOR FOR A LAND MASS SIMULATOR
Raymond A. Long, Santa Clara, and Edward E. Gray and Lew A. Raney, Palo Alto, Calif., assignors, by mesne assignments, to the United States of America as represented by the Secretary of the Navy
Filed Dec. 4, 1963, Ser. No. 328,143
8 Claims. (Cl. 343—11)

This invention relates to a sweep generator for a radar system, and more particularly to a sweep generator capable of operating in an expanded and normal mode.

It is often desirable to expand a portion of the range sweep in the vicinity of an apparent target echo so as to provide accurate ranging. This result is accomplished by increasing the speed of the sweep of the electron beam across the screen of a display indicator for a part of the time. In order to provide accurate ranging, during such expansion, particularly for a system capable of varying the start of the expansion sweep, corresponding to various selected ranges, it is necessary to accurately control and vary the speed of the expansion sweep.

One of the objects, therefore, of this invention is to provide an improved sweep generator.

Another object of this invention is to provide an improved expanded sweep generator.

A further object of this invention is to provide an expanded sweep generator capable of accurately expanding a sweep signal at a variety of starting ranges.

Other objects and many of the attendant advantages of this invention will be readily appreciated as the same becomes better understood by reference to the following detailed description when, considered in connection with the accompanying drawing wherein:

The single figure of the drawing is a functional block diagram of a sweep generator embodying the invention.

Similar numerals refer to similar parts throughout the several views.

The sweep generator illustrated in the drawing generally includes: a trigger means, having two inputs, for providing a trigger output signal when signals applied to the two inputs are equal in magnitude; a scaling means for scaling a signal applied thereto; controlling means, coupled to the scaling means and the trigger means, for controlling the transmission of the scaling means output signal; and a plurality of coupling means. The triggering means, is referred to in the drawing, as the voltage comparator 2 which provides a trigger output signal when the signals applied at its inputs 4 and 6 are equal in magnitude. The scaling means includes a scaling amplifier 8, having a variable gain and a relay means 10, for varying the scaling amplifier's gain in a particular manner, described infra. The controlling means includes: a gating means, referred to in the drawing as gate 12; a gate control means, referred to in the drawing as flip-flop 14, which provides gating control signals; and a switching means, generally indicated at 16. In addition, there is provided a stop triggering means, referred to in the drawing as a voltage comparator 18, having two inputs 20 and 22, for providing a stop triggering signal when signals applied to the two inputs 20 and 22 are equal in magnitude.

More specifically, there is coupled over lead 24, a sweep input signal, having a conventional ramp shape, coupled both to the input of scaling amplifier 8, and to one input, input 4, of voltage comparator 2. A reference range signal is coupled over lead 26, both to the input of relay logic 10, and to the second input, input 6, of the voltage comparator 2. The relay logic 10, is operatively connected to the scaling amplifier 8, in such a manner as to vary the effective gain thereof as a function of the applied reference range signal coupled to relay logic 10. The output 28 of the scaling amplifier 8, is coupled to the input 30, of gate 12. The output 32 of gate 12 is then applied, in a conventional manner, to the deflection plates of the particular display indicator (not shown) used with this sweep generator. The output 34 of voltage comparator 2, is then applied to the expanded sweep terminal E of switch 16. Pulses from a conventional timing generator (not shown), referred to as PRF generator, having a pulse repetition rate which is equal to the frequency of the applied sweep input signal are applied over lead 36 to the normal sweep terminal N of switch 16. This switch 16 will connect these pulses in the normal mode of operation, directly to the input of the flip-flop circuit 14. This switch 16, will also connect the output 34 of the voltage comparator 2, in the expanded mode of operation, directly to the input of the flip-flop circuit 14. The output 38 of this flip-flop circuit 14 is then connected over lead 40, to the gate 12, so as to control its gating state. The output 38 of said flip-flop circuit 14 is additionally connected over lead 42 to a video mixer (not shown). A standard voltage for maximum range, referred to as a maximum deflection voltage, having a magnitude which is equal to the voltage required for full-scale deflection of the display indicator used, is applied over line 44 to one input, input 22, of voltage comparator 18. The output 32, of gate 12, is also fed back over lead 46 to the other input, input 20, of said voltage comparator 18. The output 48, of said voltage comparator 18 is then coupled to the input of flip-flop 14.

In operation, a particular range is chosen from three available ranges used in the system. Thus, three sweep input signals are provided, each having a different frequency, each of which corresponds to one of the three available ranges chosen. The amplitudes of these different sweep input signals could all be maintained, by conventional means, at the same magnitude, 25 volts in this case, or scaled by appropriate conventional means in the scaling amplifier 8 in a manner similar to that described infra, so as to fully utilize the display of the associated indicator. In addition, there are provided, pulse signals having a repetition rate equal to the frequency of the corresponding sweep input signals. The three basic pulse repetition rates utilized in the embodiment illustrated are; 2040 p.p.s., 844 p.p.s., and 436 p.p.s. Each of the sweep input signals is a conventional ramp voltage, initiated concident with the start of the pulse signals, and whose length is proportional to the particular transmitting range of the antenna, and whose position along the damp is representative of the distance from the antena. Additionally, there is supplied a reference range signal, which is a signal whose magnitude is representative of the desired range at which the expanded mode of operation is to be initiated. The last signal provided is a maximum deflection voltage having a magnitude which is equal to the voltage required for full-scale deflection of the display of the indicator used.

Referring to the drawing the sweep input signal is applied over lead 24, to the input of the scaling amplifier 8. Additionally, the same sweep input signal is applied to one input, input 4, of the voltage comparator 2. Describing the operation of the device in the normal or non-expanded mode it is seen that the switch 16 is so positioned as to connect terminal N to terminal S, thus disconnecting the output 34 of the voltage comparator 2 from the input of the flip-flop 14. After amplifying said sweep input signal, by the scaling amplifier 8, amplified sweep signal is then coupled over lead 50 to the input 30 of gate 12. The pulses from the PRF generator, which are initiated simultaneously with the start of the sweep input signal, are coupled over lead 36, through the switch 16 positioned in the normal position to trigger or set flip-flop 14 thereby providing at the output 36 of said flip-flop 14, a gating control signal, which is coupled over lead 40, to the gating input of gate 32. Such gating control signals are generated in such a manner as to either enable or inhibit said gate 12, thereby allowing an output signal, existing at the output of the scaling amplifier 8 to respectively, pass through, or to be stopped, by said gate 12. This pulse from the PRF generator, generates, from flip-flop 38, an enabling gating control signal, which enables the gate 12, thereby allowing the signal at the output 28 of said scaling amplifier 8 to pass through to the deflection plates of the display indicator. Said signal at the output 32 of the gate 12 is also coupled to one input, input 20, of the voltage comparator 18. The maximum deflection voltage (standard voltage) is applied to the other input, input 22, of the voltage comparator 18. When the magnitudes of these two input voltages are equal to one another there is generated, at the output of the voltage comparator 18, a stop triggering signal which is coupled to the input of flip-flop 14 which changes the state of said flip-flop 14, resetting it, thereby generating inhibiting gating control signal which is coupled to the gating input of gate 12 which turns off, or inhibits said gate 12. During the expanded mode of operation the operation of the device is substantially the same, except that now the relay logic 10 and the voltage comparator 2 become operative. A reference range signal, the magnitude of which, effectively determines the start of the output sweep, is applied to one input, input 6, of the voltage comparator 2. Such reference range signal is then compared with the sweep input signal which is applied at the other input, input 4, of voltage comparator 2 and when their magnitudes are equal there is generated, at the output 34 of said voltage comparator 2, a start trigger voltage which sets the flip-flop 14, which is connected to the output of the voltage comparator 2 during the expanded mode of operation. This enables gate 12 allowing a signal, applied at its input, to pass through. The reference range signal is also fed to a relay logic means 10, which is operatively coupled to the scaling amplifier 8 to properly scale the sweep input signal applied thereto so that the portion of the sweep which is to be passed by gate 12, and hence the range between the reference range and the particular sweep range, is properly expanded. A brief simplified explanation of the construction and the operation of the relay logic 10 and the relay controlled scaling amplifier 8 are described infra. It should be observed (in the expanded mode) that until the magnitude of the sweep input voltage equals the reference range voltage there will be no output sweep voltage or deflection voltage. At the time the magnitude of said sweep input voltage equals the reference range voltage, the portion of the sweep which has a magnitude greater than the reference range voltage will be properly scaled and amplified and, transmitted to the deflection plates. In a similar manner when the transmitted sweep voltage at the output 32 of the gate 12 exceeds the input to the terminal 22 of the voltage comparator 18, that is when it exceeds the maximum deflection voltage (standard voltage for maximum range), there will be generated a stop trigger voltage which will reset the flip-flop 14 thereby inhibiting gate 12, ending the sweep output.

The relay logic 10 and the relay controlled scaling amplifier 8 are conventional elements. The scaling amplifier could be a combination of a conventional limiter or clipper (not shown) and an operational amplifier (not shown). The limiter could be a conventional triode base clipper, having a grid bias, $E_{cc}$, which is varied as a function of the reference range signal, so as to allow only that portion of the sweep input signal which exceeds the reference range signal, to be transmitted. It should be observed that the reference range signal is zero during the normal mode of operation, and hence all of the sweep input signal applied over lead 24 is transmitted to gate 12. An operational amplifier, having a variable gain, which is effectively controlled by the reference range signal, would then be coupled to the output of said base clipper to amplify and scale its transmitted output. This operational amplifier having a reference range signal controlled gain, could be a conventional operational amplifier having the impedance value of its feedback path, or its input impedance, varied, in such a scaled manner, as to change the overall gain of the amplifier, thereby properly scaling the sweep input signal applied thereto. Such signal would be scaled by said operational amplifier so as to fully utilize the display of the associated indicator. This scaling could be accomplished in a conventional manner, by utilizing a relay logic network which would be controlled by the reference range signal, to insert, in the operational amplifier's feedback path, a different feedback impedance for each particular reference range signal selected so as to provide the appropriate gain for the portion of the sweep input signal to be expanded. The output of said amplifier would then be coupled over lead 50 to gate 12. A typical expanded sweep waveform at the output 28 of scaling amplifier 8 is shown in the drawing.

As shown, the expanded waveform may have a slope and amplitude different from that of the sweep input waveform at input line 24 to scaling amplifier 8. The exact slope and amplitude depend on the value of the reference range voltage as well as the sweep input voltage, as explained above. If the clipper mentioned previously is used in the input of amplifier 8 a portion of the expanded sweep waveform at the output 28 of amplifier 8 is clipped. The output voltage waveform at output 32 of gate 12 may have the shape of the waveform at the output 28 of scaling amplifier 8 in both the normal and expanded sweep mode. However, if the standard voltage for maximum range at input 22 of voltage comparator 18 is less than the maximum amplitude of the output waveform, that portion of the output waveform of greater amplitude will be blocked by gate 12 in the manner previously described. Therefore the output voltage waveform at 32 may be similar to the sweep input voltage on line 24, or it may have a different amplitude and/or slope. It may be clipped or delayed with respect to the sweep input waveform or have a lesser duration, depending on the values of the reference range and maximum range voltages on lines 26 and 4. If the sweep input voltage on line 24 exceeds the voltage limitations of scaling amplifier 8 the output voltage waveform at 28 will have a flattened portion. In general the output voltage waveforms at 32 are tailored for a particular mode of operation and type of display or indicator used.

The scaling amplifier 8 may be a known amplifier such as for example, shown in FIG. 11–6(a) or 11–6(b), p. 484 of "Digital Computer Components and Circuits," by R. K. Richards, published by D. Van Nostrand Co., Inc., 257 Fourth Ave., New York 10, N.Y. The gain of such an amplifier is a function of the ratio of the feedback resistance to the input resistance and therefore the gain may be adjusted by changing either resistance.

An example of known relay configurations suitable for performing the logical function required of relay logic 10 is shown in, for example, FIGS. 3–12, p. 32, of "The Design of Switching Circuits," by Keister, Ritchie, and Washburn, 1951, published by D. Van Nostrand Co., Inc., 250 4th Ave., New York 3, N.Y. Relay logic 10 could be connected to control the gain of amplifier 8 in an obvious manner, for example a particular relay could respond to a reference range signal of a particular magnitude by operating a switch to short circuit a part of the input resistance to amplifier 8, or to switch additional resistance into the input of amplifier 8. As an alternative, the feedback resistance of amplifier 8 could be adjusted. Another relay could respond to a different level of reference range signal to operate other switches to change the feedback-input resistance ratio of amplifier 8 in a similar manner. Assuming that the limiter or clipper suggested previously were used with amplifier 8, a relay of relay logic 10 could be used to vary the bias voltage of such limiter or clipper in response to a reference range signal of appropriate magnitude. The use of such a limiter or clipper in addition to gate 12 would provide added certainty of operation and versatility in generating waveforms by preventing an undesired portion of the sweep input signal from appearing at the input of amplifier 8. It should be understood that the term "relay" is used herein in a generic sense, and is not limited to electromechanical switching devices. It would be within the skill of the art to use known electronic switching devices in relay logic 10 which would selectively respond to reference range voltages of different levels to operate electronic switches or gates to change the input or feedback resistance of scaling amplifier 8.

Any known voltage comparator which will give an output signal when an input signal waveform reaches a reference voltage level can be used as the circuit of voltage comparator 2. Voltage comparators are shown in, for example, FIGS. 3–4, p. 44, 3–8, p. 47, and FIGS. 9–5, 9–6 and 9–7, p. 332 of "Waveforms" of the Radiation Laboratory Series published by McGraw-Hill Book Co., Inc., New York.

Obviously many modifications and variations of the present invention are possible in the light of the above teachings. It is therefore to be understood that within the scope of the appended claims the invention may be practiced otherwise than as specifically described.

What is claimed is:

1. A sweep generator having a normal and expanded mode of operation for providing deflection voltages for display indicators when supplied with a sweep signal, a reference range signal, and pulse signals having a repetition rate equal to the frequency of the sweep signal comprising:
   trigger means, having two inputs, for providing a trigger output signal when signals applied to the two inputs are equal in magnitude;
   scaling means for scaling a signal applied thereto;
   first connecting means directly connected to one of said inputs of the trigger means and said scaling means, for transmitting said sweep signal to said trigger means and said scaling means;
   second connecting means, directly connected to the other said input of the trigger means and said scaling means, for transmitting said reference range signal to said trigger means and said scaling means;
   controlling means, directly connected to said scaling means and said trigger means, for controlling the transmission of the output signal of the said scaling means; and
   third connecting means, directly connected to said controlling means, for transmitting said pulse signals to said controlling means.

2. The device as in claim 1, wherein said scaling means includes;
   scaling amplifier means having a variable gain, for amplifying a signal applied thereto, and
   relay means, connected to receive said reference range signal and operatively coupled to said scaling amplifier means, for varying the gain of said scaling amplifier means.

3. The device as in claim 1, wherein said scaling means includes;
   scaling amplifier means having a variable gain, for amplifying a signal applied thereto, and
   relay means, operatively connected to said scaling amplifier means, for varying the gain of said scaling amplifier means as a function of the applied reference range signal.

4. The device as in claim 1, wherein said scaling means includes;
   scaling amplifier means having a variable gain, for amplifying a signal applied thereto, and
   relay means directly connected to said scaling amplifier means, for varying the gain of said scaling amplifier means as a function of the applied reference signal.

5. The device as in claim 1, wherein said controlling means includes;
   gating means, having an input directly connected to the output of said scaling means,
   gate control means, directly connected to said gating means, for providing gating control signals to control said gating means, and
   switching means, directly connected to said gate control means and said trigger means, for connecting said trigger means to said gate control means during the expanded mode of operation and for connecting said third connecting means to said gate control means during the normal mode of operation.

6. The device as in claim 1, wherein said scaling means includes;
   scaling amplifier means having a variable gain, for amplifying a signal applied thereto, and
   relay means operatively connected to said scaling amplifier means, for varying the gain of said scaling amplifier means, and wherein said controlling means includes;
   gating means, having an output directly connected to the output of said scaling means,
   gate control means directly connected to said gating means, for providing gating control signals to control said gating means, and
   switching means, connected to said gate control means and said trigger means, for connecting said trigger means to said gate control means during the expanded mode of operation and for connecting said third connecting means to said gate control means during the normal mode of operation.

7. The device as in claim 6, and including means whereby said relay means varies the gain of said scaling amplifier means as a function of the applied reference range signal.

8. The device as in claim 7, when additionally supplied with a maximum deflection voltage whose magnitude is proportional to the full-scale deflection of the display indicator, including;
   stop triggering means, having two inputs, for providing a stop triggering signal when signals applied to the two inputs are equal in magnitude;
   fourth connecting means, for directly connecting the output of said stop triggering means to said gate control means;
   fifth connecting means for directly connecting the output of said gating means to one of said inputs of the stop triggering means; and
   sixth connecting means for directly connecting said maximum deflection voltage to said other input of the stop triggering means.

References Cited

UNITED STATES PATENTS

| | | | |
|---|---|---|---|
| 2,552,009 | 5/1951 | Laws et al. | 343—13 |
| 2,552,022 | 5/1951 | Watson et al. | 343—13 |
| 2,555,163 | 5/1951 | Schneider | 343—13 |
| 2,836,812 | 5/1958 | Fyler | 343—11 |
| 2,850,727 | 9/1958 | Schooley | 343—13 |
| 3,088,110 | 4/1963 | Hunter | 343—11 |

RODNEY D. BENNETT, *Primary Examiner.*

ARTHUR GAUSS, *Examiner.*

J. HEYMAN, C. L. WHITHAM, *Assistant Examiners.*